United States Patent
Pursifull

(10) Patent No.: US 10,060,367 B2
(45) Date of Patent: Aug. 28, 2018

(54) METHOD AND SYSTEM FOR HIGH FUEL VAPOR CANISTER PURGE FLOW

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 467 days.

(21) Appl. No.: 14/826,997

(22) Filed: Aug. 14, 2015

(65) Prior Publication Data

US 2017/0045007 A1    Feb. 16, 2017

(51) Int. Cl.
| | |
|---|---|
| *F02M 25/08* | (2006.01) |
| *F02D 41/00* | (2006.01) |
| *B60K 15/035* | (2006.01) |
| *F02D 41/04* | (2006.01) |

(52) U.S. Cl.
CPC .... *F02D 41/0032* (2013.01); *B60K 15/03504* (2013.01); *F02M 25/089* (2013.01); *F02M 25/0836* (2013.01); *F02M 25/0854* (2013.01); *F02D 41/042* (2013.01)

(58) Field of Classification Search
CPC .............. F02D 41/042; F02D 41/0032; F02D 41/0042; B60K 15/03504; F02M 25/0854; F02M 25/0836; F02M 25/089
USPC ................................................ 123/519, 520
See application file for complete search history.

(56) References Cited

U.S. PATENT DOCUMENTS

| | | |
|---|---|---|
| 6,182,693 B1 | 2/2001 | Stack et al. |
| 6,202,632 B1 | 3/2001 | Geiger et al. |
| 6,772,741 B1 | 8/2004 | Pittel et al. |
| 6,874,484 B2 | 4/2005 | Benjey |
| 7,594,500 B2 | 9/2009 | Rockwell et al. |
| 7,845,337 B2 | 12/2010 | Song |
| 7,918,214 B2 | 4/2011 | Kerns et al. |
| 2007/0256670 A1 | 11/2007 | Williams |
| 2010/0012099 A1* | 1/2010 | Kerns ................. F02D 41/0042 123/520 |
| 2013/0112176 A1* | 5/2013 | Peters ................ F02M 25/0809 123/521 |
| 2014/0026866 A1 | 1/2014 | Pifher et al. |
| 2014/0197188 A1* | 7/2014 | Criel ................ B60K 15/03519 220/746 |
| 2014/0257668 A1 | 9/2014 | Jentz et al. |
| 2014/0283795 A1* | 9/2014 | Kimura .............. F02M 25/0809 123/520 |
| 2015/0020780 A1* | 1/2015 | Takakura ........... F02M 25/0809 123/520 |

(Continued)

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Methods and systems are provided for managing fuel vapors in a vehicle fuel system. In one example, a method includes commanding or maintaining closed a vapor blocking valve during a purging operation such that vapor flow is directed from a fuel tank to a fresh air side of a vapor canister via a first restricted vapor line, thereby enabling high purge flow rates and deep vapor canister vacuum while avoiding fuel tank vacuum. In this way, canister purge operation may be made more efficient, thereby reducing hydrocarbon bleed emissions.

18 Claims, 3 Drawing Sheets

(56) References Cited

U.S. PATENT DOCUMENTS

| | | | |
|---|---|---|---|
| 2015/0354478 A1* | 12/2015 | Dudar | F02D 41/003 |
| | | | 123/519 |
| 2016/0053726 A1* | 2/2016 | Dudar | F02M 25/089 |
| | | | 123/520 |
| 2016/0069303 A1* | 3/2016 | Pursifull | F02M 25/0836 |
| | | | 701/103 |
| 2016/0265456 A1* | 9/2016 | Dudar | F02D 41/004 |
| 2016/0369721 A1* | 12/2016 | Pursifull | F02D 41/0032 |
| 2017/0016794 A1* | 1/2017 | Dudar | G01M 3/025 |
| 2017/0058799 A1* | 3/2017 | Dudar | F02D 41/0032 |
| 2017/0159585 A1* | 6/2017 | Pursifull | F02D 41/004 |
| 2017/0211518 A1* | 7/2017 | Bartus | F02M 25/0854 |
| 2017/0350351 A1* | 12/2017 | Lucka | F02M 25/0818 |
| 2017/0356360 A1* | 12/2017 | Dudar | F02D 41/0032 |
| 2017/0363046 A1* | 12/2017 | Dudar | F02M 25/0827 |

\* cited by examiner

METHOD AND SYSTEM FOR HIGH FUEL VAPOR CANISTER PURGE FLOW

FIELD

The present description relates generally to methods and systems for controlling an evaporative emissions system to avoid gasoline tank vacuum at high fuel vapor canister purge flow rates.

BACKGROUND/SUMMARY

Vehicle emission control systems may be configured to store fuel vapors from fuel tank refueling and diurnal engine operations in a fuel vapor canister containing a suitable adsorbent, and then purge the stored vapors during a subsequent engine operation. The stored vapors may be routed to an engine intake for combustion, further improving fuel economy.

In a typical canister purge operation, a canister purge valve coupled between the engine intake and the fuel canister is opened, allowing for intake manifold vacuum to be applied to the fuel canister. On a boosted engine, that vacuum draw may be supplied via an ejector during boosted operation. Simultaneously, a canister vent valve coupled between the fuel canister and atmosphere is opened, allowing for fresh air to enter the canister. Further, in some examples a vapor blocking valve coupled between the fuel tank and the fuel canister is closed to prevent the flow of fuel vapors from the fuel tank to the engine. This configuration facilitates desorption of stored fuel vapors from the adsorbent material in the canister, regenerating the adsorbent material for further fuel vapor adsorption.

However, reduced engine operation times in hybrid vehicles can lead to insufficient purging of fuel vapors from the vehicle's emission control system. For example, regions of adsorbent that see relatively less air flow may retain relatively more hydrocarbons. The residual hydrocarbons may desorb over a diurnal cycle, leading to an increase in bleed emissions. Additionally, the capability of the canister to trap additional vapors from the fuel tank greatly depends upon how thoroughly the vapors are purged from the canister when the vehicle was last operated. Accordingly, it is desirable to purge the canister as much as possible while the engine is running.

As such, due to the shorter purge times available in hybrid vehicles, purge operations tend to be more aggressive with higher purge ramp rates (relative to corresponding non-hybrid vehicles). In one example, U.S. Pat. No. 6,202,632 B1 teaches the use of a controllable canister purge valve comprising a first connection to the intake pipe of an engine and a second connection to a vapor canister, the first and second connections interconnected via a first controllable valve, as well as through a second valve connected in parallel with the first. The second valve may comprise a larger cross section than the first valve, such that greater flow rates may be achieved via the opening of both the first and second valves, in one example.

However, the inventors herein have recognized an issue with the above approach. High purge rates can cause a significant pressure drop across the canister, thus putting the fuel tank at a vacuum. For example, during a purging operation a vacuum blocking valve (VBV) may be closed to prevent flow of fuel vapors from the fuel tank to the engine. In some examples the VBV may have a small vapor path around it, intended to let fuel vapor escape slowly as the tank pressurizes with heat gain and thus avoid pressure build. Thus, with high purge rates, vacuum may develop in the fuel tank via the vapor line around the VBV, even with the VBV closed. If the purge rate is high enough, fuel tank vacuum may become high enough to overcome the closing force of the fuel tank relief valve, thus air and dirt particles may be drawn into the tank, and this flow additionally does not serve to purge the canister.

Thus, the inventors herein have developed systems and methods to at least partially address the above issues. In one example, a method is provided, comprising during a first condition, including an engine-on condition, closing a VBV and directing vapor flow from a fuel tank to a fresh air side of a vapor canister via a first vapor line, and during a second condition, including a refueling event, opening the VBV and directing vapor flow from the fuel tank to a load side of the vapor canister via a second vapor line. In this way, VBV functionality is preserved while vacuum generated at the fuel tank may be limited during conditions of high canister purge flow rates. As one example, during a purging operation a VBV may be maintained in a closed conformation. Because the fuel tank is coupled to the vapor canister on the fresh air side, not on the load/purge side, the vacuum imposed on the fuel tank may be shallow as compared to a case in which the fuel tank is coupled to the vapor canister on the load/purge side. As such, high purge flow rates may be applied to purge the canister while low fuel tank vacuum is maintained. In this way, vapor canister purging may be made more efficient, thus reducing evaporative emissions. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
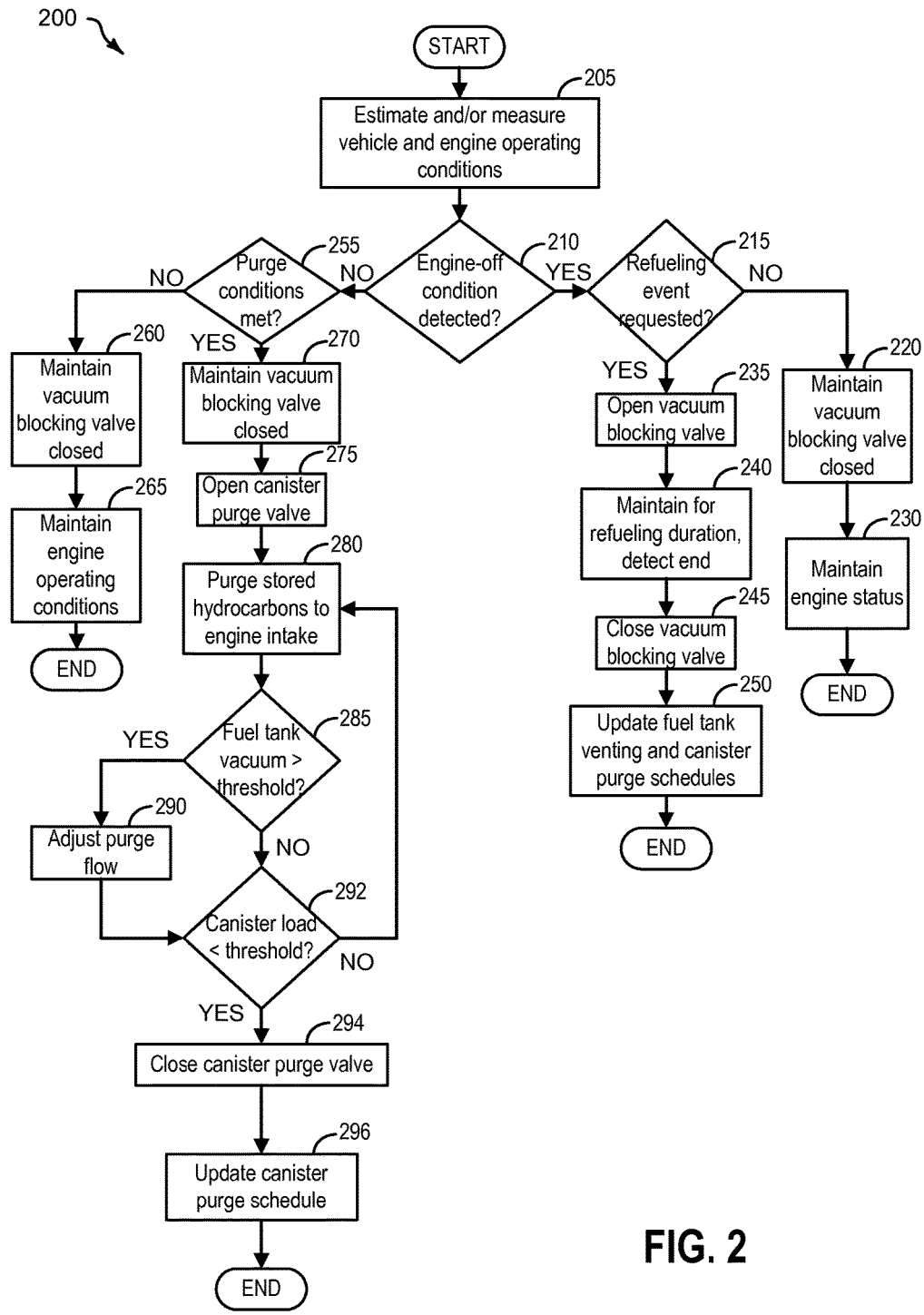
FIG. 2 shows an example method for directing fuel vapors from a fuel tank to a vapor canister via one or more paths, depending on engine operating conditions.
Figure 3:
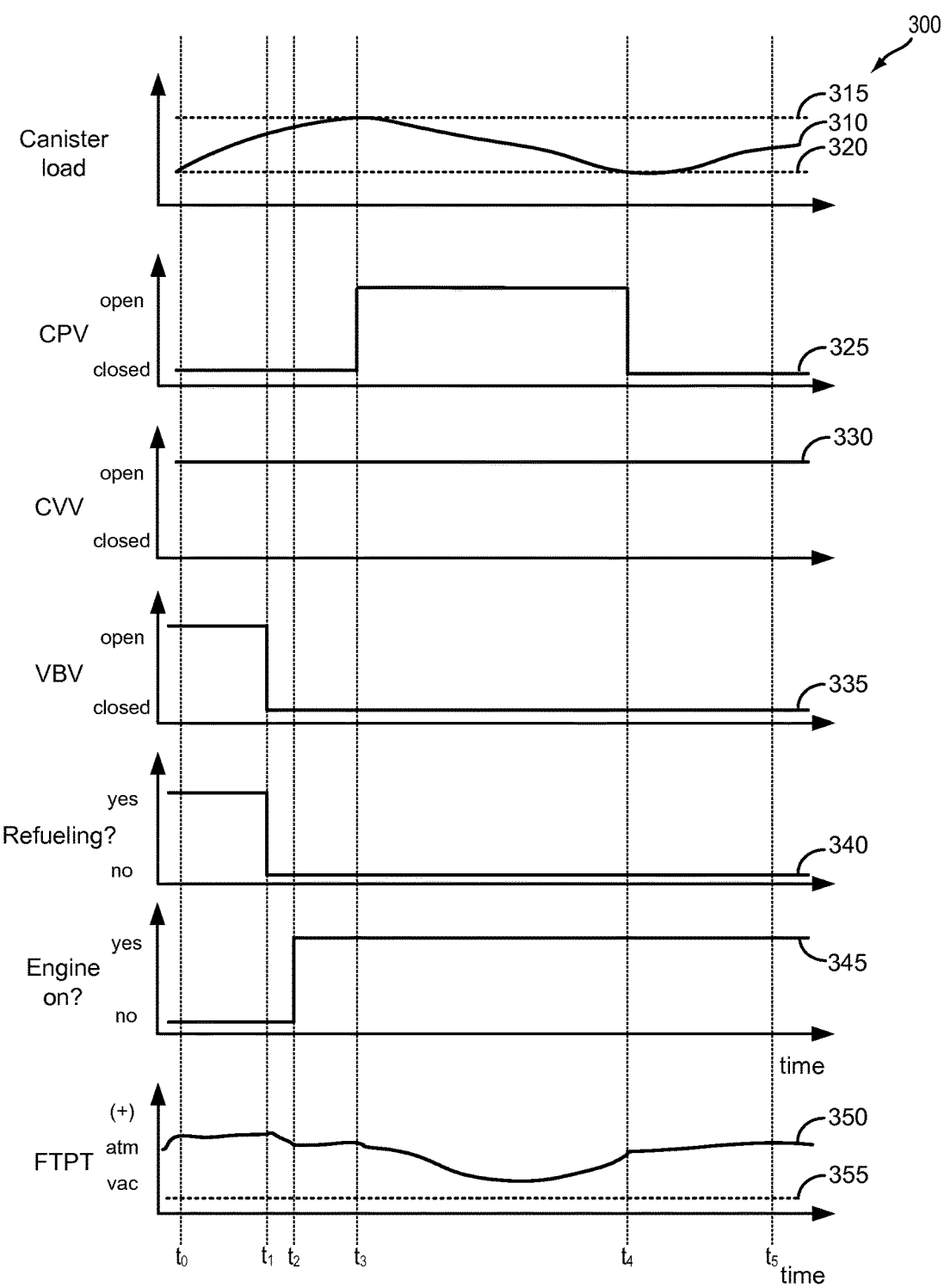
FIG. 3 shows a timeline for performing a fuel vapor canister purging operation.

The following detailed description relates to systems and methods for managing evaporative emission system fuel vapors. More specifically, the description relates to directing the flow of fuel vapors from the fuel tank to the vapor canister via one or more of two distinct paths, depending on engine operating conditions. Directing the flow of fuel vapors via one or more of the two distinct paths may be controlled by the open or closed state of a vacuum blocking valve (VBV). The VBV may be housed between the fuel tank and the vapor canister, as depicted in the engine system shown in FIG. 1. A method for directing the flow of fuel vapors from the fuel tank to the vapor canister via one or more of two distinct flow paths, under varying engine operating conditions, is depicted in FIG. 2. In one example, commanding or maintaining the VBV in a closed state during a purging operation may enable a high canister purge flow rate while minimizing the resulting vacuum imposed on the fuel tank. A timeline for performing a high flow rate purge operation incorporating these concepts is shown in FIG. 3.

Figure 1:
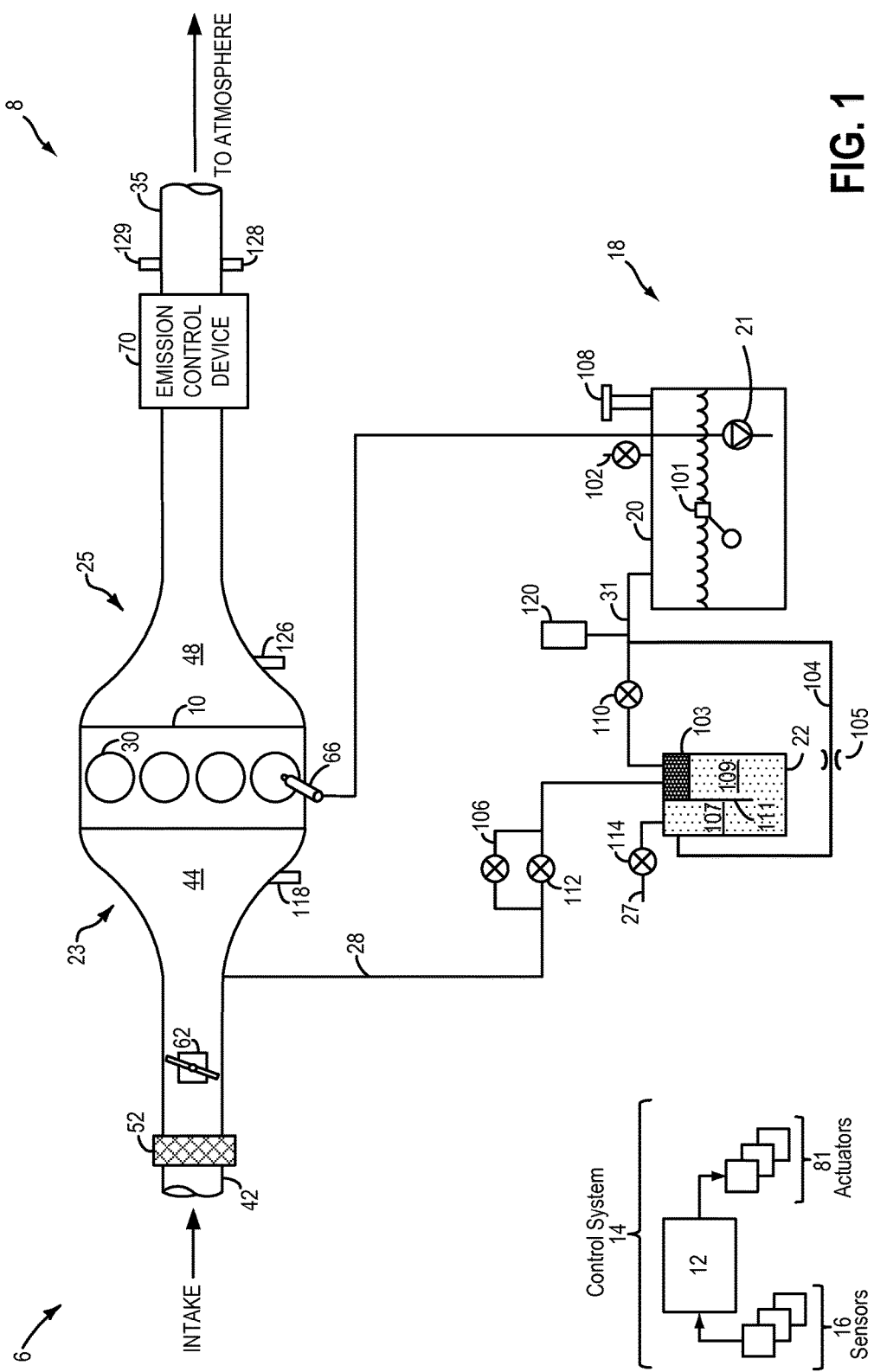
FIG. 1 shows a schematic depiction of an engine and an associated fuel system, including a bifurcated vapor line coupling the fuel tank to the vapor canister at both a fresh air side and a load side.

FIG. 1 shows a schematic depiction of a hybrid vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, engine 10 maybe a boosted engine wherein the engine intake includes a boosting device, such as a turbocharger. When included, a turbocharger compressor may be configured to draw in intake air at atmospheric air pressure and boost it to a higher pressure. The turbocharger compressor may be driven by the rotation of an exhaust turbine, coupled to the compressor by a shaft, the turbine spun by the flow of exhaust gases there-through. A boosted system may employ an ejector to provide vacuum during boost. Similar to engine vacuum, this vacuum draws fuel vapors into the engine combustion air.

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 101 located in fuel tank 20 may provide an indication of the fuel level ("Fuel Level Input") to controller 12. As depicted, fuel level sensor 101 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated (e.g., canister load is higher than a threshold), hydrocarbons stored in fuel vapor canister 22 may be purged to engine intake 23 by opening canister purge valve 112, by opening canister purge valve 106, and opening canister vent valve 114. While a single canister 22 is shown, it will be appreciated that fuel system 18 may include any number of canisters.

Canister 22 may include a buffer 103 (or buffer region), each of the canister and the buffer comprising the adsorbent. As shown, the volume of buffer 103 may be smaller than (e.g., a fraction of) the volume of canister 22. The adsorbent in the buffer 103 may be same as, or different from, the adsorbent in the canister (e.g., both may include charcoal). Buffer 103 may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor concentration spikes flowing from the fuel tank to the canister, thereby reducing any fuel vapor spikes from going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. The vent valve may be opened during fuel vapor storing operations so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In some examples, canister 22 may include a partition 111 that may extend between the vent 27 and a vapor canister purge line 28 and conduit 31 to facilitate distribution of fuel vapor and fresh air throughout the canister.

Hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient or incomplete purging of fuel vapors from the vehicle's emission control system. In some embodiments, to address this issue, an additional vacuum blocking valve (VBV) 110 (also referred to as a vapor blocking valve) may be optionally included in conduit 31 between fuel tank 20 and canister 22. In some embodiments, VBV 110 may be a solenoid valve wherein operation of the valve is regulated by adjusting a driving signal (or pulse width) of the dedicated solenoid.

During regular engine operation, VBV 110 may be kept closed to limit the amount of diurnal vapors directed to canister 22 from fuel tank 20. During refueling operations, and selected purging conditions, VBV may be opened to direct fuel vapors from the fuel tank 20 to canister 22. In addition, by opening the VBV during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. However, opening the VBV under conditions when the fuel tank pressure is higher than a threshold results in discontinuous tank pressure release and may lead to sudden increases in the richness of the purge system effluent which may impact the purge rate. An alternative to opening the VBV upon a fuel tank pressure build is to incorporate a restricted vapor passage around the VBV, thus allowing fuel vapors to slowly and continuously bleed around the VBV. Adding a small leak path bypassing 110 reduces or eliminates the need for opening 110 due to over-pressurization. For example, a restricted vapor line is commonly incorporated around the VBV such that the fuel tank is coupled to the load/purge side of the vapor canister (not shown). Alternately this passage can be implemented via putting a nick (or notch) into the valve seat of the VBV.

However, as discussed in further detail below and in relation to FIGS. 2-3, without line 104 significant fuel tank vacuum may develop responsive to high purge flow rates in fuel systems wherein a restricted vapor passage bypasses the VBV. Thus, according to embodiments disclosed herein, an overall bifurcated fuel vapor line may be present to couple the fuel tank to both the fresh air side (107) and load/purge side of the canister (109). The first segment of the fuel vapor line (104) may include a restriction (105) and may be coupled to the fresh air side, and not the load/purge side (109), while the VBV may be disposed in a second segment of the fuel vapor line coupled to the load/purge side. Additionally, the restriction disposed in the first vapor line may comprise a smaller cross-section that the cross section of the vapor line comprising the VBV under conditions wherein the VBV is open. In other words, opening the VBV may create a path of least resistance from the fuel tank to the load/purge side of the vapor canister.

Accordingly, as shown in FIG. 1, a first fuel vapor line 104 may contain a restriction 105, in order to limit flow rate, for example the restriction may comprise an appropriately sized orifice, sonic choke, etc. First fuel vapor line 104 thus may function to prevent the tank from pressurizing and tank air and vapor may come out continuously. In one example, first fuel vapor line 104 may be fluidically coupled to conduit 31 at a location upstream of the VBV, between the VBV and the fuel tank, and fluidically connected to the fresh air side 107 of the vapor canister. When arranged in this way, fuel vapors from the fuel tank 20 may flow to the vapor canister, via one of two paths, depending on the state of the VBV. For example, if the VBV is open, fuel vapors may be directed to the vapor canister via conduit 31 through open VBV to the load/purge side 109 of the canister. If however, the VBV is closed, fuel vapors may be directed to the vapor canister via the first fuel vapor line 104, to the fresh air side 107 of the canister, and not to the load/purge side 109 of the canister. Incorporation of the fuel vapor line 104, having a restriction, fluidically coupled to the vapor canister on the fresh air side may significantly reduce the development of fuel tank vacuum responsive to high purge flow rates, described in further detail below and in relation to FIGS. 2-3.

One or more pressure sensors 120 may be coupled to fuel tank 20 for estimating a fuel tank pressure or vacuum level. For example, pressure sensor 120 may comprise a fuel tank pressure transducer (FTPT). While the depicted example shows pressure sensor 120 coupled between the fuel tank and VBV 110 along conduit 31, in alternate embodiments, the pressure sensor may be coupled to fuel tank 20. In still other embodiments, a first pressure sensor may be positioned upstream of the vapor blocking valve, while a second pressure sensor is positioned downstream of the vapor blocking valve, to provide an estimate of a pressure difference across the valve.

Fuel vapors released from canister 22, for example during a purging operation, may be directed into engine intake manifold 44 via purge line 28. The flow of vapors along purge line 28 may be selectively regulated by one or more canister purge valves 106 and 112, coupled between the fuel vapor canister and the engine intake. In some examples, canister purge valves 106 and 112 may be arranged in parallel. Canister purge valve 106 may be a conventional canister purge valve and may comprise a continuously adjustable valve with a smaller flow cross-section than canister purge valve 112. Accordingly, canister purge valve 112 may be referred to as a low restriction valve (e.g., having a lower restriction that valve 106), with a larger cross-section than canister purge valve 106. In some examples, the low restriction valve 112 may comprise a valve which may be either open or closed, while the purge valve 106, may be continuously adjusted or regulated. In this way, use of the adjustable valve may be selectively utilized through a certain range of engine performance characteristics for a sufficiently fine control of the purging operation, and only when, for example, a short, complete purging of the vapor canister is required, may the second valve be additionally opened. In other examples, only the canister purge valve 106 or only canister purge valve 112 may be utilized. As such, responsive to the shorter purge times available in hybrid vehicles, higher purge flow rates may be thus achieved via the incorporation of a low restriction valve such as valve 112, in addition to a conventional purge valve, such as valve 106.

The quantity and rate of vapors released by the canister purge valve(s) may be determined by the duty cycle of an associated canister purge valve solenoid (not shown). As such, the duty cycle of the canister purge valve solenoid(s) may be determined by the vehicle's powertrain control module (PCM), such as controller 12, responsive to engine operating conditions, including, for example, engine air flow rate, an air-fuel ratio, a canister load, fuel vapor concentration in the canister effluent, etc. By commanding the canister purge valve(s) to be closed, the controller may seal the fuel vapor recovery system from the engine intake.

Especially for boosted engines, an optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode, wherein the controller 12 may close VBV 110 and open canister vent valve (CVV) 114 while closing canister purge valve (CPV) 112 to direct vapors into the fresh air side 107 via vapor line 104 to canister 22 while preventing fuel vapors from being directed into the intake manifold. As such, pressure build-up in the tank may be avoided and fuel tank vapors effectively contained within canister 22.

As another example, the fuel system may be operated in a refueling mode (e.g., when fuel tank refueling is requested by a vehicle operator), wherein the controller 12 may open VBV 110 and canister vent valve 114, while maintaining canister purge valve 112 closed, to depressurize the fuel tank before allowing enabling fuel to be added therein. As such, VBV 110 may be kept open during the refueling operation to allow refueling vapors to be stored in the canister. As the vapor line 104 contains a restriction 105, when VBV 110 is opened vapors may be directed to the load/purge side 109 of canister 22, as the path of least resistance to vapor flow is via the conduit 31 to the canister load/purge side. Accordingly, under conditions wherein vapor generation is high, such as refueling, vapors are introduced to the canister at the load/purge side thereby maximizing the exposure of hydrocarbons to adsorbent material as vapors travel from the load/purge side towards the fresh air side 107 of canister 22. After refueling is completed, the VBV and the canister vent valve may be closed.

As yet another example, the fuel system may be operated in a canister purging mode (e.g., after an emission control device light-off temperature has been attained and with the engine running), wherein the controller 12 may open canister purge valve 112 and canister vent valve 114 sequentially, with the canister purge valve opened before the canister vent valve is opened. Herein, the vacuum generated by the intake manifold of the operating engine may be used to draw fresh air through vent 27 and through fuel vapor canister 22 to purge the stored fuel vapors into intake manifold 44. To isolate the fuel tank from the engine intake manifold vacuum, canister purging may be performed with VBV 110 closed. In this mode, the purged fuel vapors from the canister are combusted in the engine. The purging may be continued until the stored fuel vapor amount in the canister (herein also referred to as the canister load) is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

As described above, high purge rates may be required responsive to the shorter purge times available in hybrid vehicles. High purge rates may be accomplished, for example, via the incorporation of a low restriction canister purge valve, such as canister purge valve 112. However, as discussed, high purge flow rates may result in putting the fuel tank at significant vacuum, potentially overcoming the fuel tank relief valve 102 thus leading to the drawing of air and dirt particles into the tank, the air flow additionally not serving to purge the canister. To meet the requirement for high purge flow rates and reduced fuel tank vacuum, a vapor line, such as vapor line 104 may be coupled to the vapor canister at the fresh air side, and not at the load/purge side. As such, the vacuum seen by the fuel tank may be far shallower than in an alternative arrangement in which a vapor line (not shown) is coupled to the fuel tank on the load/purge side of the vapor canister.

Controller 12 may also be configured to intermittently perform leak detection routines on fuel system 18 to confirm that the fuel system is not degraded. As such, leak detection routines may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then seal the fuel system while monitoring a change in fuel tank pressure (e.g., a rate of change in the vacuum level, or a final pressure value).

In one example, to perform the leak test, negative pressure generated at engine intake 23 is applied on the fuel system until a threshold level is reached. Then, the fuel system is isolated from the engine intake and a rate of vacuum bleed-up is monitored. Based on the rate of change in fuel system vacuum, a fuel system leak can be identified. In another example, where at least some negative pressure is held in the fuel system (such as at the fuel tank) before purging is stopped (via timed closing of the canister vent valve), the fuel system vacuum may be advantageously used during non-purging conditions to identify a fuel system leak. Specifically, the fuel tank vacuum/pressure may be monitored during the non-purging conditions and a leak may be determined based on the rate at which the fuel tank pressure bleeds up from the vacuum conditions to barometric pressure. In one example, a fuel system leak may be determined based on the rate of change in fuel tank pressure being larger than a threshold rate. Herein, by using the existing fuel tank vacuum to assess for leaks during non-purging conditions, the need for an auxiliary or dedicated vacuum source for performing leak detection routines is decreased. In addition, by performing the leak detection using the existing fuel system vacuum during non-purging conditions, completion of the leak detection routine in the limited engine running time available on hybrid vehicles may be better enabled.

VBV 110 may be maintained open during the leak detection routine. Alternatively, in an example wherein the VBV may be sealed very tightly when in a closed conformation, the leak detection routine may be performed with the VBV in both an open and closed position, thereby narrowing the location of the leak source. Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include fuel injector 66, VBV 110, purge valves 106 and 112, vent valve 114, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 2.

In this way, the system of FIG. 1 enables a method for a fuel system in a hybrid vehicle, to manage fuel vapors during engine-off conditions including refueling operations, and engine-on conditions including purging operations. By coupling a vapor line from the fuel tank to the fresh air side of the vapor canister, the system of FIG. 1 enables high purge flow rates while protecting the fuel tank from significant vacuum.

A flow chart for an example method 200 for managing fuel vapors is shown in FIG. 2. More specifically, method 200 includes, in a first condition, for example a canister purging operation, commanding or maintaining closed a VBV and directing vapor flow from a fuel tank to a vapor canister via a first vapor line connecting the fuel tank to a fresh air side of the vapor canister, not the load/purge side of the canister, and during a second condition, for example a refueling event, commanding or maintaining open the VBV and directing flow from the fuel tank to the vapor canister via a second vapor line connecting the fuel tank to a load/purge side of the vapor canister. Method 200 will be described with reference to the system described herein and shown in FIG. 1, though it should be understood that similar methods may be applied to other systems without departing from the scope of this disclosure. Method 200 may be carried out by a controller, such as controller 12 in FIG. 1, and may be stored at the controller as executable instructions in non-transitory memory. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

Method 200 begins at 205 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. At 210 method 200 includes determining whether an engine-off condition is detected. An engine-off condition may be indicated by a key-off event, a user setting a vehicle alarm following exiting a vehicle that has been parked, a user depressing a button, an automatic engine shutdown, or other suitable indicator. In some examples, certain vehicle-on, engine-off conditions, such as those which may occur in a hybrid vehicle operating in battery-only mode, may be sufficient to proceed with an evaporative emissions system leak test. If at 210 an engine-off event is detected, method 200 proceeds to 215 where it is determined whether a refueling event has been requested. For example, a refueling request may comprise a vehicle operator depression of a refueling button on a vehicle instrument panel in the vehicle, or at a refueling door. In some examples, a refueling request may comprise a refueling operator requesting access to a fuel filler neck, for example, by attempting to open a refueling door, and/or attempting to remove a gas cap. If a refueling event has not been requested, the method 200 proceeds to 220, wherein method 200 includes maintaining the VBV closed. Maintaining the VBV closed directs any fuel vapors generated while the engine is off, to the fresh air side of the vapor canister via the vapor line, such as vapor line 104 described in FIG. 1. As the vapor line comprises a restriction, such as restriction 105 described in FIG. 1, fuel vapor may be released slowly from the fuel tank as pressure builds in the fuel tank. In this way, excessive pressure builds in the fuel tank are avoided, and vapor released from the fuel tank is efficiently captured in the vapor canister. Continuing at 230, method 200 includes maintaining the status of the fuel system, and may further include maintaining the status of the evaporative emissions system. For example, components such as the CVV, CPV, and refueling lock may be signaled by the controller to maintain their current conformation. Method 200 may then end.

Returning to 215, if a request for refueling is received, method 200 proceeds to 235. At 235, method 200 includes depressurizing the fuel tank. Alternatively, depressurizing the fuel tank may be conducted at engine-off or key-off at 210. As described in relation to FIG. 1, a vapor line, such as vapor line 104, may allow excessive pressure builds in the fuel tank to be avoided by directing fuel tank vapor to the fresh air side of the canister while the VBV is closed. However, the vapor line may contain a restriction, such as restriction 105, and as such pressure in the fuel tank may rise to levels greater than atmospheric pressure depending on environmental conditions. Thus, prior to refueling, the fuel tank may be depressurized. For example, the controller 12 may open a VBV valve (such as VBV 110) and open or maintain open a vent path between the fuel vapor canister and atmosphere (e.g., open CVV such as CVV 114), while maintaining a canister purge valve (e.g., CPV 112) closed, to depressurize the fuel tank before allowing enabling fuel to be added therein. The VBV may be opened in a manner to depressurize the fuel tank at a predetermined rate, so as to prevent rapid depressurization which may cause damage to fuel system components. A refueling lock may be maintained locked until the fuel tank pressure decreases to a threshold pressure (e.g., atmospheric pressure), and then commanded to unlock, thus allowing access to the fuel filler neck only following fuel tank depressurization.

Continuing at 240, method 200 includes maintaining open the VBV and canister vent path for the duration of the refueling event, thus directing fuel vapor from the fuel tank to the load/purge side of the fuel vapor canister, and to allow gasses stripped of refueling vapors to be flowed to atmosphere. As the flow path from the fuel tank to the load/purge side comprises the path of least restriction for the fuel vapor due to the larger cross sectional area of the vapor line with an open VBV as compared to the restricted vapor line, vapor flow via the restricted vapor line (e.g., 104) to the fresh air side of the canister, may be significantly prevented. The refueling event may be monitored, for example, via a fuel tank fill level sensor (e.g., 101) and one or more fuel tank pressure sensors (e.g., 120) for the duration of the refueling event. Monitoring fuel tank pressure may include receiving signals from the one or more fuel tank pressure sensors continuously, or at predetermined time intervals such that a predetermined number of fuel tank pressure measurements can be performed over the duration of the refueling event. Similarly, monitoring fuel level may include the control system receiving information regarding the level of fuel stored in the fuel tank via one or more fuel level sensors, either continuously or at predetermined intervals over the duration of the refueling event. The end of the refueling event may be indicated based on one or more of the fuel tank pressure and fuel level. For example, the end of the refueling event may be indicated when a fuel level has plateaued for a duration, and when a fuel tank pressure has not increased over the plateau duration. In other examples, the end of the refueling event may be indicated responsive to a refueling nozzle being removed from the fuel filler neck, replacement of a fuel cap, closing of a refueling door, etc. Continuing at 245, method 200 includes closing the VBV. With the VBV closed, the path of least resistance to air flow may thus be via the restricted vapor line, such as vapor line 104 in FIG. 1. As previously discussed, due to a restriction (e.g., 105), fuel vapor may be released slowly, enabling efficient capture of hydrocarbons at the fresh air side of the vapor canister, and effectively avoiding excessive fuel tank pressure builds. Following closing the VBV, method 200 includes updating a canister purge schedule in accordance with the refueling event and may further include updating a canister loading state. A canister loading state may be determined based on hydrocarbon sensors, and/or temperature sensors positioned within the vapor canister, fuel tank pressure during the refueling event, etc. In another example, closing the VBV may be delayed until shortly after engine startup. Method 200 may then end.

Returning to 210, if an engine-off event is not detected, method 200 proceeds to 255 where it is determined whether purge conditions are met. In one example, purge conditions may be considered met when the canister load (estimated or inferred) is higher than a threshold. The canister load may be estimated based on, for example, pressure differences across the canister, an air/fuel ratio estimated downstream of the canister, hydrocarbon sensors and/or temperature sensors positioned within the vapor canister, and/or based on fuel vapor concentrations learned on an immediately previous canister loading and/or purging operation. If at 255 it is determined that purge conditions are not met, method 200 proceeds to 260 where the VBV is maintained closed. As such, maintaining the VBV closed directs fuel vapors from the fuel tank to the fresh air side of the vapor canister, not the load/purge side, via the restricted vapor line, such as vapor line 104. Thus, during engine on conditions, pressure builds in the fuel tank due to, for example increases in temperature as a result of engine operation, may be released via the restricted vapor line and vapors captured and stored in the vapor canister. Continuing at 265, method 200 includes maintaining current engine operating conditions. For example, components such as the CVV, CPV may be signaled by the controller to maintain their current conformation. Method 200 may then end.

Returning to 255, if it is determined that purge conditions are met, method 200 proceeds to 270. At 270, method 200 includes maintaining closed the VBV. Maintaining closed the VBV during a purge operation ensures that fuel vapor will not be drawn out of the fuel tank by intake manifold vacuum. Next, at 275, method 200 includes opening one or more canister purge valves, for example canister purge valves 106 and 112 as described in FIG. 1. In one example, requirement for a low purge flow rate may be indicated based on canister purge conditions specified at 255, thus only a low flow canister purge valve, such as purge valve 106, may be opened and/or adjusted. In other examples, requirement for a high canister purge flow rate may be indicated based on canister purge conditions specified at 255. Responsive to a high canister purge rate requirement, both low flow canister purge valve (e.g., 106) and high flow/low restriction purge valve (e.g., 112) may be opened and/or adjusted.

Continuing at 280, method 200 includes purging hydrocarbons from a fuel system canister to an engine intake with the CVV and the one or more canister purge valves open, and with the VBV maintained closed. More specifically, by opening the one or more canister purge valves, an intake manifold vacuum (from the running engine) is applied on the canister bed and hydrocarbons stored in the canister are drawn into, and combusted in, the engine. With the CVV open, fresh air is concomitantly forced to flow through the canister bed, increasing the efficiency of the canister purge. As discussed above, if high flow purge rates are required, excessive fuel tank vacuum may result under some conditions. More specifically, a high flow rate through the canister creates a pressure drop across the canister, the pressure drop equating to a vacuum at the canister line coupled to the CPVs (106, 112), i.e., at 103. Because the fuel tank conduit 31 couples to the vapor canister in the same region, the fuel tank sees the same vacuum. This may be corrected by coupling the fuel tank to the fresh air side of the vapor canister, not the load/purge side, via the restricted vapor line (e.g., 104), and adding VBV 110. Thus, the VBV blocks the vacuum to the tank while line 104 vents the tank to a pressure near atmosphere. In an example wherein a leak orifice is included within VBV 110, orifice 105 may be significantly larger than the leak orifice within 110, thereby maintaining the fuel tank nearer atmospheric pressure than the vacuum at 103. In this way, high canister purge flow rates may be achieved without excessive fuel tank vacuum generation, even in the presence of an intended leak flow through a closed VBV 110.

To ensure excessive vacuum does not develop, at 275, method 200 includes indicating whether there is negative pressure in the fuel tank, and if the fuel tank vacuum is greater than a threshold. At 285, indicating whether fuel tank vacuum is greater than a threshold may include receiving signals from one or more fuel tank pressure sensors, such as fuel tank pressure sensor 120, continuously, or at predetermined time intervals over the duration of the purging operation. If at 285, it is determined that fuel tank vacuum is greater than a threshold, method 200 proceeds to 290. At 290, method 200 includes adjusting purge flow. In one example, adjusting purge flow may include adjusting the low flow canister purge valve (e.g., 106) to a more closed state, such that the overall purge flow rate is reduced and a reduction in fuel tank vacuum is achieved. In another example, the high flow/low restriction canister purge valve (e.g. 112) may be commanded shut, thus reducing purge flow to a level determined by the state of the low flow canister purge valve. Other examples of adjusting purge flow via exerting control over the one or more canister purge valves may additionally be contemplated.

Returning to 285, if it is determined that fuel tank vacuum is not greater than a threshold, or alternatively if fuel tank vacuum is greater than a threshold requiring purge flow adjustment at 290, method 200 proceeds to 292 where it is determined if the canister load (estimated or inferred) is lower than a threshold. More specifically, it may be determined if the canister has been sufficiently purged such that the purging operation can be discontinued. Canister loading state may be determined based on hydrocarbon sensors, and/or temperature sensors positioned within the vapor canister, for example. If the canister load is not below a threshold, the routine may return to 270 to continue purging hydrocarbons from the canister. If sufficient canister purging has occurred, then method 200 includes closing the CPV at 294. Method 200 then proceeds to 296 where a canister purge schedule is updated. For example updating the canister purge schedule may include updating the loading state of the canister. Method 200 may then end.

FIG. 3 shows an example timeline 300 for conducting a vapor canister purge operation according to the methods described herein and with reference to FIG. 2, and as applied to the systems described herein and with reference to FIG. 1. Timeline 300 includes plot 310, indicating a canister load, over time. Line 315 represents a first threshold canister load, above which indicates that a canister purge operation is required. Line 320 represents a second threshold canister load, below which represents a purged canister. Timeline 300 further includes plot 325, indicating the open or closed state of a canister purge valve over time, plot 330, indicating the open or closed state of a canister vent valve over time, and plot 335, indicating the open or closed state of a vapor blocking valve over time. Timeline 300 further includes plot 340, indicating whether a refueling event is occurring, over time. Timeline 300 further includes plot 345, indicating the off or on state of the engine, over time. Timeline 300 further includes plot 350, indicating the pressure in the fuel tank, over time. Line 355 represents a threshold vacuum, below which the level of vacuum is such that air may be drawn into the tank via a fuel tank relief valve.

At time $t_0$, the engine is off, indicated by plot 345, and is in a state of being refueled, indicated by plot 340. As such, the VBV, indicated by plot 335, and the CVV, indicated by plot 330, are both open. Additionally, the CPV, indicated by plot 325, is closed. As described further in relation to FIG. 1, when the VBV is open the path of least resistance to vapor flow from the fuel tank to the canister is via the vapor line (e.g., 31) to the canister load/purge side, not to the fresh air side. Accordingly, during refueling, wherein vapor generation is high, the introduction of vapors to the load/purge side serves to maximize the exposure of hydrocarbons to the adsorbent material housed within the canister, as vapors travel from the load/purge side towards the fresh air side of the canister. As the vehicle is being refueled, fuel tank pressure is slightly above atmospheric pressure, indicated by plot 350.

As such, between time $t_0$ and $t_1$, during the course of the refueling event, canister load increases, indicated by plot 310. As described above, canister load may be estimated based on, for example, pressure differences across the canister, an air/fuel ratio estimated downstream of the canister, hydrocarbon sensors and/or temperature sensors positioned within the vapor canister, and/or based on fuel vapor concentrations learned on an immediately previous canister loading and/or purging operation. At time $t_1$, the refueling even is complete. Accordingly, the VBV is commanded closed. With the VBV closed, the fuel system may be operating in a storage mode wherein fuel vapors are directed to the fresh air side (e.g., 107), not the load/purge side (e.g., 109), of the vapor canister via the restricted vapor line (e.g., 104). As such, pressure build-up in the tank may be avoided and fuel tank vapors effectively contained within the canister.

At time $t_2$, the engine is turned on. Between time $t_2$ and $t_3$, while the vehicle is in operation, the canister load continues to slightly build as a result of heat transfer from the engine to the fuel tank. With the VBV closed, vapors generated in the fuel tank are directed to the canister via the restricted vapor line (e.g., 104). At time $t_3$, canister load crosses a threshold, indicated by line 315, indicating a requirement for a purge operation. The threshold may be set based on, for example, a load state such that further introduction of fuel vapor to the canister may result in bleed emissions. Based on the canister load reaching a threshold, a high purge flow rate may be indicated. Accordingly, to achieve a high flow rate, one or more of canister purge valve(s) (e.g., 106, 112) are commanded open, indicated by plot 325. As one example, both a low flow (e.g., 106) and a high flow (e.g., 112) canister purge valve may be commanded open. Additionally, the CVV, indicated by plot 330 is maintained open, and the VBV, indicated by plot 335 is maintained closed.

Between time $t_3$ and $t_4$, the vapor canister is purged by high flow. Accordingly, the canister load state steadily decreases during the purging operation, indicated by plot 310. Additionally, fuel tank vacuum is monitored by a fuel tank pressure sensor (e.g., FTPT 120). As the canister is being purged with a high flow, the fuel tank experiences the development of a vacuum, yet the vacuum does not reach a threshold vacuum, indicated by line 355. The threshold may indicate a vacuum sufficient to draw air (and dirt) in via the fuel tank vacuum relief valve (e.g. 102). That the fuel tank vacuum remains below a threshold results from the arrangement of the restricted vapor line (e.g., 104) described in relation to FIG. 1 and the method described in FIG. 2. With the VBV closed during purge operation and the restricted vapor line coupled to the fuel tank and the fresh air side of the vapor canister, high purge flow rates are enabled while avoiding the development of excessive fuel tank vacuum.

At time $t_4$ canister load crosses a threshold, indicated by line 320. Accordingly, the canister has been sufficiently purged and thus the CPV is commanded closed. As the engine is still in operation, the CVV is maintained open, and the VBV is maintained closed. During the time between $t_4$ and $t_5$, the canister load state begins to increase, the result of heat transfer from the engine to the fuel tank, thus generating fuel vapors that are directed from the fuel tank to the fresh air side, not the load/purge side, of the canister.

In this way, fuel tank vapors may be directed to a fuel vapor canister via one or more of a plurality of pathways, based on the open or closed state of a VBV. For example, vapors may be directed to a fresh air side, and not a load/purge side, of the fuel vapor canister in the case where the VBV is closed, and directed toward a load/purge side, and not a fresh air side, of the canister when the VBV is opened. As such, during a refueling event when vapor generation is at a high level, VBV may be in an open state, thus fuel tank vapors may be directed towards a load/purge side of the vapor canister, maximizing the potential for vapor adsorption via the vapor canister. In another example, during a canister purge event, the VBV may be commanded closed, thus preventing the flow of fuel vapors from the fuel tank to the engine. In yet another example, including an engine-off condition wherein the vehicle is not in a refueling operation, the VBV may be closed, thus fuel tank vapors may be directed towards the fresh air side of the vapor canister, preventing the fuel tank from pressurizing and capturing fuel tank vapors in the vapor canister.

The technical effect directing fuel tank vapors to a fuel vapor canister via one or more of a plurality of pathways, based on the open or closed state of a VBV is to preserve the functionality of the VBV and restricted vapor line arrangement, while reducing the amount of fuel tank vacuum generated during purging operations. In this way, due to the shorter purge times available in hybrid vehicles, the purge operations may comprise much higher rates while excessive fuel tank vacuum may be avoided. By enabling higher vapor canister purge rates, the vapor canister may be more effectively purged of stored hydrocarbons, thus reducing evaporative emissions.

The systems described herein and with reference to FIG. 1, along with the methods described herein and with reference to FIG. 2 may enable one or more systems and one or more methods. In one example, a method for an engine, comprises, during a first condition, closing a vacuum blocking valve (VBV) and directing vapor flow from a fuel tank to a fresh air side of a vapor canister via a first vapor line; and during a second condition, opening the VBV and directing vapor flow from the fuel tank to a load/purge side of the vapor canister via a second vapor line. In a first example of the method, the method includes wherein directing vapor flow via the first vapor line comprises directing vapor flow through a restriction in the first vapor line. A second example of the method optionally includes the first example and further includes wherein the restriction is comprised of an orifice or a sonic choke. A third example of the method optionally includes any one or more or each of the first and second examples and further includes wherein an overall vapor line bifurcates upstream of the restriction into the first vapor line and second vapor line, wherein the VBV is positioned in the second vapor line. A fourth example of the method optionally includes any one or more or each of the first through third examples and further includes wherein the first condition comprises engine operation. A fifth example of the method optionally includes any one or more or each of the first through fourth examples and further includes wherein the first vapor line does not couple the fuel tank to the load/purge side of the vapor canister. A sixth example of the method optionally includes any one or more or each of the first through fifth examples and further includes wherein the first condition comprises a canister purge event. A seventh example of the method optionally includes any one or more or each of the first through sixth examples and further includes wherein the vapor canister is divided into the fresh air side and the load side by a partition housed within the canister, the fresh air side further including a vent line connected to fresh air via a canister vent valve (CVV), the load side connected to an intake manifold via one or more canister purge valves (CPV), including a conventional CPV and/or a low restriction CPV. An eighth example of the method optionally includes any one or more or each of the first through seventh examples and further comprises, during the canister purge event, commanding open the low restriction CPV. A ninth example of the method optionally includes any one or more or each of the first through eighth examples and further includes wherein the canister purge event comprising an open low restriction CPV includes indicating whether a fuel tank vacuum is greater than a threshold. A tenth example of the method optionally includes any one or more or each of the first through ninth examples and further includes wherein indicating a fuel tank vacuum greater than a threshold includes reducing purge flow rate such that fuel tank vacuum is maintained below the threshold. An eleventh example of the method optionally includes any one or more or each of the first through tenth examples of the method and further includes wherein the second condition includes a refueling event.

An example of a system for an engine comprises a fuel vapor canister partitioned into a fresh air side and a load/purge side; a fuel tank; and a bifurcated vapor line connecting the vapor canister to the fuel tank, a first segment of the line comprising a restricted orifice disposed within the first vapor line segment and connecting to the vapor canister on the fresh air side, a second segment of the vapor line comprising a vacuum blocking valve (VBV) disposed within the second vapor line segment and connecting to the vapor canister on the load/purge side. In a first example, the system further comprises a canister vent line coupled to the fuel vapor canister on the fresh air side; a canister vent valve disposed within the canister vent line and configured to selectively couple the vapor canister to fresh air; a canister purge line coupled to the fuel vapor canister on the load/purge side; and one or more canister purge valves (CPV) disposed within the canister purge line and configured to selectively couple the vapor canister to the an intake manifold. A second example of the system optionally includes the first example and further comprises a controller holding executable instructions stored in non-transitory memory, that when executed, cause the controller to: during engine operation, command the VBV closed; and during a refueling event, command the VBV open. A third example of the system optionally includes any one or more or each of the first and second examples and further includes wherein the one or more CPVs comprise a first CPV and a second, low restriction CPV having a lower restriction than the first CPV, and wherein the controller has further instructions that when executed cause the controller to, during a canister purge event, open the low restriction CPV and maintain the VBV closed. A fourth example of the system optionally includes any one or more or each of the first through third examples and further includes wherein when the VBV is open, the second segment of the bifurcated vapor line has a smaller amount of restriction than the first segment of the bifurcated vapor line such that fuel vapor may flow from the fuel tank to the vapor canister load side via the open VBV.

Another example of a system for an engine comprises a fuel vapor canister partitioned into a fresh air side and a load/purge side; a fuel tank; and a bifurcated vapor line connecting the vapor canister to the fuel tank, a first segment of the vapor line comprising a restricted orifice disposed within the first vapor line segment and connecting to the vapor canister on the fresh air side, a second segment of the vapor line comprising a vacuum blocking valve (VBV) disposed within the second vapor line segment and connecting to the vapor canister on the load/purge side; a canister vent line coupled to the fuel vapor canister on the fresh air side; a canister vent valve disposed within the canister vent line and configured to selectively couple the vapor canister to fresh air; a canister purge line coupled to the fuel vapor canister on the load/purge side; a first canister purge valve (CPV) and second CPV each configured to selectively couple the vapor canister to the an intake manifold, the second CPV having a lower restriction than the first CPV; and a controller holding executable instructions stored in non-transitory memory, that when executed, cause the controller to: responsive to a request to perform a canister purge with a target flow rate above a threshold, maintain the VBV closed, open the second CPV, and adjust a position of the first CPV to reach the target flow rate, and responsive to a request to refuel the fuel tank, open the VBV. In a first example, the system further comprises wherein the second segment of the fuel vapor line has a cross-sectional area that is larger than a cross-sectional area of the orifice, and wherein when open, the VBV does not restrict the second segment of the fuel vapor line. A second example of the system optionally includes the first example and further includes wherein the first segment of the vapor line does not couple the fuel tank to the load/purge side of the vapor canister, and wherein the second segment of the vapor line does not couple the fuel tank to the fresh air side of the vapor canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a first condition including a canister purge event, closing a vacuum blocking valve (VBV) and directing vapor flow from a fuel tank to a fresh air side of a vapor canister via a first vapor line; and
during a second condition, opening the VBV and directing vapor flow from the fuel tank to a load/purge side of the vapor canister via a second vapor line, the vapor canister divided into the fresh air side and the load/purge side by a partition housed within the canister, the fresh air side further including a vent line connected to fresh air via a canister vent valve (CVV), the load/purge side connected to an intake manifold via one or more canister purge valves (CPV), including a first CPV and/or a lower restriction CPV.

2. The method of claim 1, wherein directing vapor flow via the first vapor line comprises directing vapor flow through a restriction in the first vapor line.

3. The method of claim 2, wherein the restriction is comprised of an orifice or a sonic choke.

4. The method of claim 2, wherein an overall vapor line bifurcates upstream of the restriction into the first vapor line and second vapor line, wherein the VBV is positioned in the second vapor line.

5. The method of claim 1, wherein the engine is in operation during the canister purge event.

6. The method of claim 1, wherein the first vapor line does not couple the fuel tank to the load/purge side of the vapor canister.

7. The method of claim 1, further comprising, during the canister purge event, commanding open the low restriction CPV.

8. The method of claim 7, wherein the canister purge event comprising the open low restriction CPV includes indicating whether a fuel tank vacuum is greater than a threshold.

9. The method of claim 8, wherein indicating the fuel tank vacuum greater than the threshold includes reducing a purge flow rate such that the fuel tank vacuum is maintained below the threshold.

10. The method of claim 1, wherein the second condition includes a refueling event.

11. A system for an engine, comprising:
a fuel vapor canister partitioned into a fresh air side and a load/purge side;
a fuel tank; and
a bifurcated vapor line connecting the fuel vapor canister to the fuel tank, a first segment of the line comprising a restricted orifice disposed within the first vapor line segment and connecting to the fuel vapor canister on the fresh air side, a second segment of the vapor line comprising a vacuum blocking valve (VBV) disposed within the second vapor line segment and connecting to the vapor canister on the load/purge side.

12. The system of claim 11, further comprising:
a canister vent line coupled to the fuel vapor canister on the fresh air side;
a canister vent valve disposed within the canister vent line and configured to selectively couple the fuel vapor canister to fresh air;
a canister purge line coupled to the fuel vapor canister on the load/purge side; and
one or more canister purge valves (CPV) disposed within the canister purge line and configured to selectively couple the fuel vapor canister to an intake manifold.

13. The system of claim 12, further comprising a controller holding executable instructions stored in non-transitory memory that, when executed, cause the controller to:
during engine operation, command the VBV closed; and
during a refueling event, command the VBV open.

14. The system of claim 13, wherein the one or more CPVs comprise a first CPV and a second, low restriction CPV having a lower restriction than the first CPV, and wherein the controller has further instructions that, when executed, cause the controller to, during a canister purge event, open the low restriction CPV and maintain the VBV closed.

15. The system of claim 13, wherein when the VBV is open, the second segment of the vapor line has a smaller amount of restriction than the first segment of the vapor line such that fuel vapor may flow from the fuel tank to the load/purge side of the fuel vapor canister via the open VBV.

16. A system for an engine, comprising:
a fuel vapor canister partitioned into a fresh air side and a load/purge side;

a fuel tank; and
a bifurcated vapor line connecting the fuel vapor canister to the fuel tank, a first segment of the vapor line comprising a restricted orifice disposed within the first vapor line segment and connecting to the fuel vapor canister on the fresh air side, a second segment of the vapor line comprising a vacuum blocking valve (VBV) disposed within the second vapor line segment and connecting to the fuel vapor canister on the load/purge side;
a canister vent line coupled to the fuel vapor canister on the fresh air side;
a canister vent valve disposed within the canister vent line and configured to selectively couple the fuel vapor canister to fresh air;
a canister purge line coupled to the fuel vapor canister on the load/purge side;
a first canister purge valve (CPV) and a second CPV each configured to selectively couple the fuel vapor canister to the an intake manifold, the second CPV having a lower restriction than the first CPV; and a controller holding executable instructions stored in non-transitory memory that, when executed, cause the controller to:
responsive to a request to perform a canister purge with a target flow rate above a threshold, maintain the VBV closed, open the second CPV, and adjust a position of the first CPV to reach the target flow rate, and
responsive to a request to refuel the fuel tank, open the VBV.

17. The system of claim 16, wherein the second segment of the vapor line has a cross-sectional area that is larger than a cross-sectional area of the orifice, and wherein when open, the VBV does not restrict the second segment of the vapor line.

18. The system of claim 16, wherein the first segment of the vapor line does not couple the fuel tank to the load/purge side of the fuel vapor canister, and wherein the second segment of the vapor line does not couple the fuel tank to the fresh air side of the fuel vapor canister.

* * * * *